350-360
SR
XR 3,110,824
TX 3095N
SEARCH ROOM
SUBSTITUTE FOR MISSING XR

Nov. 12, 1963 W. C. FLANAGAN 3,110,824

PIEZOELECTRIC ACTUATING ELEMENT

Filed Oct. 31, 1960 2 Sheets-Sheet 1

WILLIAM C. FLANAGAN
INVENTOR.

BY R. Frank Smith
Lloyd F. Seebach
ATTORNEY & AGENT

Nov. 12, 1963 W. C. FLANAGAN 3,110,824

PIEZOELECTRIC ACTUATING ELEMENT

Filed Oct. 31, 1960 2 Sheets-Sheet 2

WILLIAM C. FLANAGAN
INVENTOR.

BY R. Frank Smith
Lloyd L. Seibach
ATTORNEY & AGENT

United States Patent Office 3,110,824 Patented Nov. 12, 1963

3,110,824

PIEZOELECTRIC ACTUATING ELEMENT

William C. Flanagan, Rochester, N.Y., assignor to Eastman Kodak Company, Rochester, N.Y., a corporation of New Jersey Filed Oct. 31, 1960, Ser. No. 66,074
3 Claims. (Cl. 310—8.5)

Figure 1:
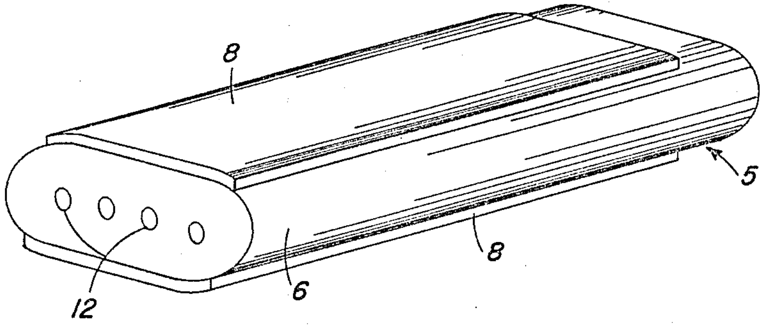

This invention relates to improvements in actuating elements. More particularly the invention relates to improved cantilever actuating elements for selectively positioning movable elements in light gating, electrical switching, and other apparatus.

In this invention an improved actuating element is provided in which a cantilever member composed of piezo electric materials is strained in a controlled electric field to move an element attached thereto to a selected operating position.

Cantilever actuating elements are advantageously used in electrical switching, gating, memory and the like applications. One well known actuating element is the metal reed, a thin flexible strip mounted as a cantilever having attached to its free end, a member such as a switch contact, shutter element, or the like. This member is selectively positioned by bending the cantilever element. Various means are known for bending the metal reed, for instance, electromagnets are provided to attract the metal reed to one or more desired positions selectively. Certain disadvantages of the previously known cantilever actuating elements are overcome by the present invention. In the metal reed, for instance, the elasticity of the reed may cause undesirable bounce effects. The constant flexing of the reed causes eventual failure due to metal fatigue. In apparatus where adjacent metal reed actuating elements are closely spaced, the electromagnets used for bending one reed may exert unwanted effects on adjacent reeds. The necessary elastic properties of the metal reed limit the speed of operation of the actuating element and limit the amount of deflection permissible without unwanted resilient effects.

Piezoelectric properties of certain crystalline materials are well known. One known property of piezoelectric materials sometimes called the converse piezoelectric effect is that strain is produced in the crystals of the material by an electric field imposed across the material. Piezoelectric crystal elements can be manufactured which will bend due to the converse piezoelectric effect in an electric field.

Ceramic material is used in these manufactured elements which is polycrystalline in nature and does not have piezoelectric properties in its original state. Piezoelectric properties can be induced in crystals of this ceramic material during manufacture by special polarizing treatment. The direction of the electrical and mechanical axes in the piezoelectric crystal element depends upon the direction of the original polarizing field which can be controlled during manufacture. These crystal elements are adapted during manufacture to respond in an imposed electric field by bending along their longitudinal axes to a predetermined configuration.

A piezoelectric crystal element can be made to be held fixedly at one end for mounting it as a cantilever with the opposite end free to move. When an electric field is imposed across the piezoelectric crystal, so mounted, the free end will be displaced from the neutral axis of the cantilever by bending of the crystal. Separated electrodes are attached to this manufactured piezoelectric crystal element in such a relation that an electric field is imposed across the crystal when voltage is applied to the electrodes. The electrodes are fixed with respect to the crystal so that the field produced by the electrodes is aligned with the "put-in" axes of the crystal to cause it to bend in the desired way. This crystal element with electrodes so mounted is called a "multimorph."

An object of the invention is to provide improved apparatus comprising a piezoelectric crystal cantilever element in which the piezoelectric properties of the crystal element are employed to position an attached operating element.

Another object of the invention is to provide apparatus comprising an improved cantilever actuating element which is bounce free, may be operated at low energy levels, may be latched in a selected position and may be operated at high operational speeds with low mass and high deflections and has a long operational life in the range of billions of trouble free operations.

Another object of the invention is to provide improved apparatus comprising an actuating element which can be electrically controlled while spaced extremely close to similar elements without noticeable interaction effects between the elements when electrical control is applied.

Another object of the invention is to provide improved apparatus comprising an actuating element which is small and compact.

Another object of the invention is to provide an improved cantilever beam actuating element which is not affected by fatigue effects ordinarily caused by repeated flexing of the element.

Another object of the invention is to provide an improved piezoelectric actuating element which can be used to selectively move a movable element to one or more predetermined positions by applying a predetermined voltage.

Another object of the invention is to provide apparatus comprising an improved electrically controlled actuating element which is positioned selectively according to the polarity of the voltage applied.

Another object of the invention is to provide improved electrical relay switching apparatus comprising a switching element which is positioned by a piezo electric crystal cantilever element.

Another object of the invention is to provide a light shutter controlled by a piezo electric crystal cantilever element.

Another object of the invention is to provide improved apparatus comprising a piezo electric actuating element and having memory storage features.

Other objects and advantages of the invention will be apparent from the following detailed description with reference to the drawings.

Figure 4:
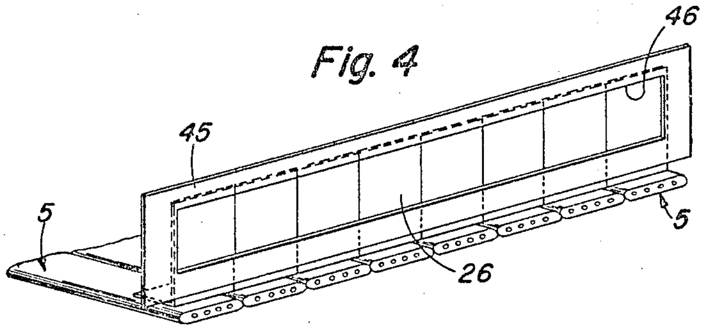
Figure 2:
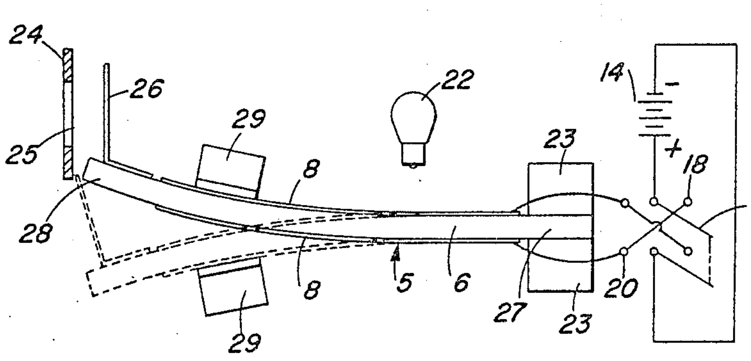
Figures 3, 5, 6:
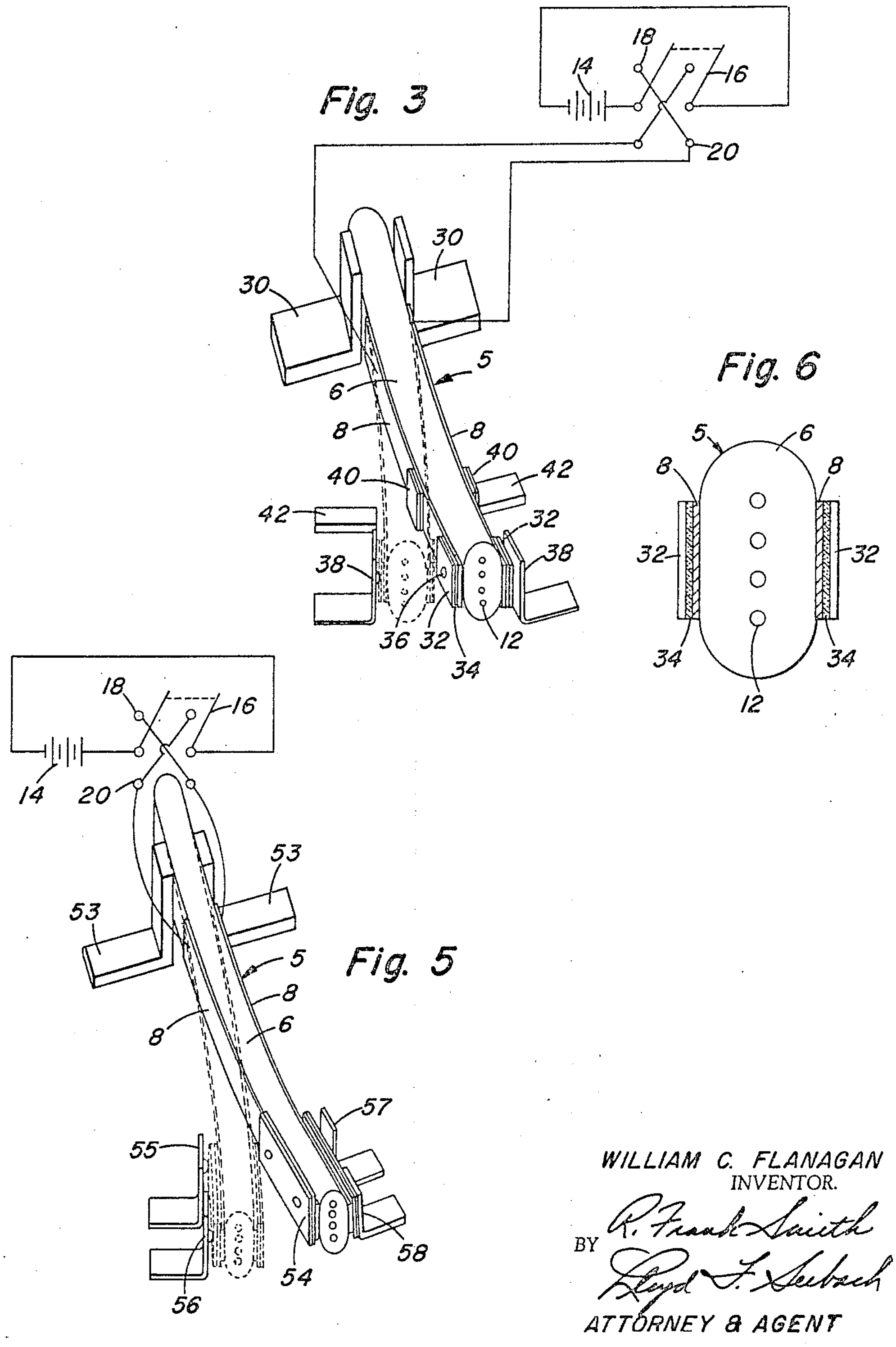

In the drawings FIG. 1 is an isometric sketch of a piezo electric multimorph which may be used as the actuating element in apparatus embodying the invention. FIG. 2 is a diagrammatic sketch illustrating a light shutter apparatus embodying the invention. FIG. 3 is a diagrammatic sketch illustrating electric switching apparatus embodying the invention. FIG. 4 is an isometric view of apparatus illustrating one embodiment of this invention in which a battery of closely spaced piezo electric actuating elements are employed. FIG. 5 is a diagrammatic perspective view of another embodiment of an electric switching apparatus embodying the invention. FIG. 6 is an end view of the multimorph shown in FIG. 3.

Referring to FIG. 1 the multimorph 5 preferred for use in the invention comprises a piezo electric crystal 6 having opposed electrodes 8 of metal foil or the like fixed along the longitudinal sides of the crystal. The electrodes 8 and the crystal 6 are adapted and cooperatively aligned during manufacture so that when voltage is applied to the electrodes 8 an electric field is produced across the crystal causing the crystal to flex or bend along its longitudinal axis. The extent of bending, i.e., the degree of strain in the crystal, is directly proportional to the voltage applied to the electrodes. With this multimorph mounted as a cantilever the free end of the cantilever will be displaced when the crystal bends. The direction of displacement will be according to the alignment of the mechanical and electrical axes of the multimorph and the distance of displacement of the free end will be proportional to the voltage applied to the electrodes 8. When a predetermined voltage is applied to the electrodes, the crystal will bend, moving its free end to a predetermined position away from the neutral axis of the cantilever.

Referring again to FIG. 1 inner electrodes 12 of soft graphite are provided in channels running parallel to the longitudinal axis of the multimorph. These inner electrodes 12 are used during manufacture for polarizing the ceramic crystal to obtain the desired pre-set piezoelectric properties of the multimorph. Though these electrodes 12 are not used in the embodiments described herein, they could be used in applications of the invention in conjunction with electrodes 8. For example, leads can be attached to each of electrodes 12 and terminated in a common lead which is connected to one side of the voltage source. In this instance electrodes 8 would then be connected together and by a common lead connected to the other side of the voltage source, the action of the multimorph, upon application of a voltage, being the same as when only electrodes 8 are used.

A preferred multimorph is adapted to be flexed as a cantilever, the direction of flexing being dependent on the direction of polarity of the electrical field. Thus, if voltage is applied with the electrodes polarized in one direction, the crystal will flex or bend in this one direction and when the polarity of the electrodes is reversed, the crystal will flex or bend in the opposite direction.

In FIG. 2 the multimorph 5 is shown fixedly mounted at one end 27 as a cantilever by members 23. A predetermined voltage is applied by a voltage source 14 connected through a polarity reversing switch 16 to electrodes 8. When the switch 16 is thrown to one contact position 20, the predetermined voltage is applied in one direction of polarity to the electrodes 8 causing the crystal 6 to bend a predetermined distance in one direction. When the direction of polarity is reversed by throwing the switch 16 to contact the opposite poles 18, the crystal bends in the opposite direction. An associated light gating system comprises a light source 22, a light barrier 24 having an aperture 25, and a shutter 26. The shutter 26 is attached to the cantilever mounted crystal at a point away from the fixed end 27 of the crystal, preferably near the free end 28. When the crystal 6 bends in one direction, as shown by solid lines in FIG. 2, the shutter 26 is moved by the crystal to a fixed position between the light source 22 and the aperture 25, the exact position of the shutter in either position being determined by fixed or adjustable stops 29. When the crystal bends in the opposite direction, the shutter 26 is moved in that direction to another fixed position, thereby opening the aperture 25 as shown by dotted lines in FIG. 2. When a multimorph is mounted as a cantilever, only the crystal 6 is secured between members 23. In other words, electrodes 8 extend from the free end of the multimorph up to or just short of the mounting members 23. For certain applications, such as the one just described above, the electrodes need not extend to the free end of the crystal 6 but can extend up to any member carried by the crystal 6 at its free end such as shutter 26. However, the flexing action of the multimorph is enhanced if the electrodes 8 extend to the very end of crystal 6.

FIG. 3 illustrates another embodiment of the invention as a simple electrical relay element having a memory state determined by latching of the multimorph in one of its two positions. A multimorph 5, a voltage source 14, and polarity reversing switch 16 are provided as described above. Also as described above, the multimorph 5 is mounted as a cantilever with one end fixed between clamp members 30. An electrical conductor, in this case a metal strip 32, is secured on each side of the multimorph adjacent its free end and over an electrode 8, each strip 32 being insulated from its respective electrode 8 by a layer 34 of insulating material such as epoxy resin cement and carrying a contact 36 near the end thereof. At predetermined positions on each side of the multimorph, an electric terminal 38 is arranged to be engaged by one of contacts 36 depending on the direction in which the multimorph is flexed or bent when the predetermined voltage is applied, the direction of bending depending on the polarity of the electric field applied to electrodes 8 by the polarity reversing switch 16. Thus, the operator by throwing the switch to close either poles 18 or poles 20 selects which of the terminals 38 is to be engaged by the contact 36 on strip 32. The strips 32 and terminals 38 are connected as switching elements in any associated electrical circuits (not shown) which are closed by bringing one of contacts 36 against one of the terminals 38. In such a case a lead would be connected to each of strips 32 and to each of terminals 38. In either position of multimorph 5, when a contact 36 is in engagement with a terminal 38, a circuit would then be completed. The end of the multimorph could also be utilized as a common contact member if strips 32 were combined to envelope the free end of the multimorph in which case a single lead would then be connected thereto.

A second strip 40, preferably of soft iron, is mounted on each side of the multimorph, spaced from strips 32 as shown in FIG. 3 and insulated from electrodes 8 in the same manner as strips 32. Permanent magnets 42 are placed in fixed positions to engage the respective strips 40 to magnetically retain the multimorph 5 when one of the contacts 36 engages one of the terminals 38. The attractive force of the magnets 42 is sufficient to retain the contact 36 and the terminal 38 in engagement even after the voltage is removed from the multimorph. In other words, when the polarity reversing switches are opened the multimorph remains bent as it was when the predetermined voltage was last applied. However, when the predetermined voltage is applied with the polarity reversed, the stress in the piezoelectric crystal tending to bend the multimorph in the opposite direction is sufficient to pull the strip 40 away from its respective magnet 42 so the other contact 36 is then moved by the multimorph into engagement with the other terminal 38 (as shown by dotted lines). In this position the other magnet 42 engages the other strip 40 until such time as the polarity is again reversed.

This relay switching device thus "remembers" the polarity of the last electrical field applied by remaining in the position induced by that field. The retaining structure just described can be used in the disclosure of FIG.2 to provide a memory state for the shutter 26.

When no voltage is applied to the electrodes 8 the crystal will ordinarily assume its unbent position. This unbent position can be used in certain applications of the invention, FIG. 2, where an additional operating position is wanted. Thus, with the multimorph described above, using a predetermined voltage and a polarity reversing switch it is possible to move an attached movable element to at least three predetermined operating positions, that is, at least two positions in the opposite directions of bending and a third position where the multimorph is unstrained or in a neutral or zero voltage position.

In FIG. 4 a plurality of the light gating system shown in FIG. 2 are arranged in side by side relation and with respect to a plate 45 provided with an elongated aperture 46. Such a device can be used for providing a light pattern as a display or call device which would be in accordance with any combination of the shutters 26 actuated to an unobstructing position by their respective cantilever mounted multimorph 5. For example, a window can be mounted on plate 45 which would carry a number or letter aligned with each of shutters 26 and would be illuminated by source 22 when its respective shutter is actuated to an unobstructing position, as shown by the dotted lines in FIG. 2.

The embodiment disclosed and described with respect to FIG. 3 is one type of memory state in which the multimorph is latched by the magnets even though the applied voltage is removed and it is not until a voltage of the opposite polarity is applied that the memory state is changed. A second type of memory state is one in which the applied voltage retains the multimorph in one of its flexed positions. This second type of memory state can be one in which the multimorph is actuated by positive and/or negative pulses and with no signals assumes its neutral or zero voltage position. Under these conditions, a multimorph can be used in a circuit as a relay to close one or more sets of contacts, the multimorph itself serving as the element movable between the pairs of contacts. As shown in FIG. 5, the multimorph is mounted as a cantilever between clamp members 53, the voltage source 14 and switch 16 being illustrative of a source of positive and negative pulses which are applied to electrodes 8 as described above. One or more shorting strips 54 can be mounted in spaced relation on each side of the multimorph and insulated from the electrodes 8 as described above, only one such strip being shown on each side of the multimorph and adjacent its free end in FIG. 5. The strips are insulated from their respective electrodes, as in FIG. 3, or can envelop the multimorph in one or more strips. In the latter case, the multimorph, which has the electrodes 8 fixed to each side of crystal 6, can be dipped in the epoxy resin to provide an insulating layer and then one or more spaced bands of a suitable and highly conductive metallic foil can be wrapped or placed around the multimorph. Bands of a metallic paint having suitable conductive qualities could also be painted or sprayed onto the multimorph. The length of such shorting strips would have to be in accordance with the separation of the contacts to be bridged or shorted by the strips. Contacts 55 and 56 are arranged on one side of multimorph 5 and a second set of contacts 57 and 58 are arranged on the other side, the location of the contacts being such that with a signal of one polarity strip 54 would bridge contacts 55 and 56 and with a signal of the other polarity strip 54 would bridge contacts 57 and 58. It can be readily appreciated that the spacing of the contacts on either side of the multimorph will determine the length of strip 54 and if contacts 55 and 56 or 57 and 58 are connected into any circuit, the circuit would be completed when the strip 54 is in engagement with one of the pairs of said contacts. With the application of successively spaced positive or negative signals, the multimorph will engage the respective pair of contacts to complete the circuit for the duration of the signal and then return to a zero voltage position. On the other hand, if positive and negative pulses are intermingled, then the multimorph will move from one set of contacts to the other. If a signal changes from one polarity to another with no dwell at the zero voltage level, the response time of the multimorph is faster than if a dwell exists between successive signals of opposite polarity. This difference in response is due to the fact that only the internal electrical leakage paths diminish the magnitude of the electrical field across the multimorph to bring it to its neutral or zero voltage position. After a voltage source has been applied across the multimorph, it assumes a bent position, as described above. However, with removal of the voltage source, the multimorph tends to remain in its bent position until the electrical field across the multimorph is diminished by the internal leakage or the shorting of the multimorph electrodes.

Since modifications and other applications of the invention described above will be apparent to those skilled in the art, the invention is not to be limited to the disclosure herein but is of a scope as defined by the appended claims.

I claim:

1. In a shutter actuating device, the combination comprising a light source, a shutter member movable relative to a predetermined light path emanating from said light source, a piezoelectric element mounted at one end and having a free end on which said shutter member is mounted, a first electrode secured to the side of said element on which said shutter member is mounted, a second electrode secured to the other and opposite side of said element, said electrodes extending substantially between said shutter member and the point at which said element is mounted, and means for applying an electromotive force to said electrodes to establish an electrical field across said field causing said element to flex as a cantilever so as to move said shutter member relative to said light path.

2. In a shutter actuating device, the combination comprising a light source, a shutter member positioned with respect to said light source and adapted to be moved between a position in which said shutter is in a predetermined light path emanating from said light source and a position in which said shutter member is removed from said light path, a piezoelectric element mounted at one end and having a free end on which said shutter member is mounted, a first electrode secured to the side of said element on which said shutter member is mounted, a second electrode secured to the other and opposite side of said element, said electrodes extending longitudinally of said element substantially between said shutter member and the point at which said element is mounted, and switch means for applying an electromotive force to said electrodes to establish an electrical field across said element which causes said element to flex as a cantilever in one direction and move said shutter member into one of said positions and for reversing the polarity of said field so as to flex said element in the other direction and move said shutter member into the other of said positions.

3. A shutter actuating device in accordance with claim 2 and including magnetic latching means comprising a permanent magnet arranged on each side of said element in the path of movement thereof and with respect to the positions of said shutter member for engagement by its respective electrode to hold said element in the position as determined by the polarity of the electrical field when said electromotive force is removed from said electrodes.

References Cited in the file of this patent

UNITED STATES PATENTS

| | | |
|---|---|---|
| 2,195,417 | Mason | Apr. 2, 1940 |
| 2,927,177 | Nemeth | Mar. 1, 1960 |